(12) United States Patent
Yoo et al.

(10) Patent No.: US 7,159,999 B2
(45) Date of Patent: Jan. 9, 2007

(54) BACKLIGHT ASSEMBLY AND LIQUID CRYSTAL DISPLAY APPARATUS HAVING THE SAME

(75) Inventors: Hyeong-Suk Yoo, Yongin-si (KR); Joong-Hyun Kim, Yongin-si (KR); Seok-Hyun Nam, Seoul (KR); Jong-Sun Lim, Seoul (KR); Seock-Hwan Kang, Suwon-si (KR); Jin-Seob Byun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 184 days.

(21) Appl. No.: 10/855,395

(22) Filed: May 28, 2004

(65) Prior Publication Data

US 2005/0013134 A1 Jan. 20, 2005

(30) Foreign Application Priority Data

May 31, 2003 (KR) .................... 10-2003-0035107

(51) Int. Cl.
*F21V 21/00* (2006.01)
(52) U.S. Cl. .................. 362/249; 362/240; 362/561; 362/97; 362/260; 349/64; 349/69

(58) Field of Classification Search .............. 362/23, 362/29, 97, 225, 240, 249, 260, 329, 561; 349/64, 69
See application file for complete search history.

(56) References Cited

U.S. PATENT DOCUMENTS

| 6,198,234 B1* | 3/2001 | Henry .................. 315/291 |
| 2002/0015297 A1* | 2/2002 | Hayashi et al. ............ 362/31 |

* cited by examiner

Primary Examiner—Stephen F Husar
Assistant Examiner—Meghan K. Dunwiddie
(74) Attorney, Agent, or Firm—Cantor Colburn LLP

(57) ABSTRACT

In a backlight assembly and a liquid crystal display apparatus, a plurality of lamps disposed in a receiving space of the backlight assembly is spaced apart from each other by various intervals between the lamps depending upon positions at which the lamps are disposed. Each of the lamps may also have an external electrode having a different area from each other or due to the positions at which the lamps are disposed. Furthermore, each of the lamps may have a different amount of discharge gas injected thereinto due to the positions at which the lamps are disposed. Accordingly, the liquid crystal display apparatus may provide a uniform brightness, and prevent deterioration of display quality thereof.

21 Claims, 6 Drawing Sheets

BACKLIGHT ASSEMBLY AND LIQUID CRYSTAL DISPLAY APPARATUS HAVING THE SAME

CROSS-REFERENCE TO RELATED APPLICATION

This application relies for priority upon Korean Patent Application No. 2003-35107 filed on May 31, 2003, the contents of which are herein incorporated by reference in its entirety.

BACKGROUND OF THE INVENTION

1. Field of the Invention

The present invention relates to a backlight assembly and a liquid crystal display apparatus having the backlight assembly. More particularly, the present invention relates to a backlight assembly capable of improving image display quality and a liquid crystal display apparatus having the backlight assembly.

2. Description of the Related Art

In general, a liquid crystal display apparatus displays an image using optical properties of liquid crystal. In order to display the image, the liquid crystal display apparatus includes a liquid crystal display panel on which the image is displayed and a backlight assembly that provides light to the liquid crystal display panel.

A backlight assembly is classified into an edge type backlight assembly and a direct illumination type backlight assembly in accordance with a position of a lamp unit that emits the light.

In the edge type backlight assembly, a lamp unit that emits the light is disposed in an area adjacent to a side surface of a light guide plate. The edge type backlight assembly is applied to a small-size or a medium-size liquid crystal display apparatus.

In the direct illumination type backlight assembly, a lamp unit that emits the light is disposed under the liquid crystal display panel. The direct illumination type backlight assembly is applied to a medium-size or a large-size liquid crystal display apparatus that requires a plurality of lamps.

In the direct illumination type backlight assembly, the plurality of lamps is disposed under the liquid crystal display panel so as to supply the light to the liquid crystal display panel. Thus, the direct illumination type backlight assembly may provide a high brightness light compared with the edge type backlight assembly.

However, the direct illumination type backlight assembly generates more heat than the edge type backlight assembly because the direct illumination type backlight assembly includes more lamps than the edge type backlight assembly. Especially, since the liquid crystal display apparatus is vertically disposed while the liquid crystal display panel is used, the heat generated from the lamps is concentrated at an upper portion of the liquid crystal display apparatus due to convection of the heat.

Thus, although the heat generated from each of the lamps is substantially identical to each other, a temperature at the upper portion of the liquid crystal display apparatus higher than a temperature at a lower portion of the liquid crystal display apparatus.

As a result, brightness at the upper portion of the liquid crystal display apparatus greatly increases in comparison with brightness at the lower portion of the liquid crystal display apparatus so that the liquid crystal display apparatus may not provide uniform brightness, thereby deterioration the image display quality of the liquid crystal display apparatus.

BRIEF SUMMARY OF THE INVENTION

The present invention provides a backlight assembly capable of improving image display quality.

The present invention provides a liquid crystal display apparatus having the above backlight assembly.

In one aspect of the present invention, a backlight assembly includes a receiving container to provide a receiving space, and a plurality of lamps received into the receiving space in parallel to each other. The lamps are spaced apart from each other by various intervals between the lamps.

The receiving container includes a bottom surface and a sidewall extended from an edge of the bottom surface to provide the receiving space. The interval between the lamps gradually increases from a first end of the receiving container to a second end of the receiving container, which is substantially parallel to the first end.

In another aspect of the present invention, a backlight assembly includes a receiving container to provide a receiving space, and a plurality of lamps received into the receiving space in parallel to each other. Brightness for each of the lamps varies in accordance with temperature distribution of the receiving space.

Each of the lamps includes a lamp tube into which a discharge gas is injected, a first electrode disposed at a first end portion of the lamp tube and a second electrode disposed at a second end portion of the lamp.

The first electrode is formed on an outer surface of the first end portion of the lamp tube. The first electrode has an area that gradually decreases from a first end of the receiving container to a second end of the receiving container, which is substantially parallel to the first end of the receiving container.

Each of the lamps has an amount of the discharge gas that gradually increases from the first end of the receiving container to the second end of the receiving container, which is substantially parallel to the first end, and each of the lamps has a tube current from about 5 to about 6 milliamperes.

The discharge gas includes an argon gas and a neon gas. The amount of the neon gas injected into the lamps gradually decreases from the first end to the second end, and the amount of the argon gas injected into the lamps gradually increases from the first end to the second end of the receiving container.

The receiving container has an inner temperature less than about 50 degrees.

In another aspect of the present invention, a liquid crystal display apparatus includes a liquid crystal display panel to display an image using liquid crystal, a receiving container having a bottom surface and a sidewall extended from an edge of the bottom surface so as to provide a receiving space, and a plurality lamps received into the receiving space in parallel to each other and disposed between the liquid crystal display panel and the receiving container so as to provide light to the liquid crystal.

The lamps are disposed in the receiving space such that an interval between the lamps gradually increases from a first end of the receiving container to a second end of the receiving container, which is substantially parallel to the first end.

In still another aspect of the present invention, a liquid crystal display apparatus includes a liquid crystal display panel to display an image using liquid crystal, a receiving container having a bottom surface and a sidewall extended from an edge of the bottom surface so as to provide a receiving space, and a plurality of lamps received into the receiving space in parallel to each other and disposed between the liquid crystal display panel and the receiving container so as to provide light to the liquid crystal.

Each of the lamps has a lamp tube into which a discharge gas is injected, and a first electrode and a second electrode disposed at a first end portion and a second end portion of the lamp tube, respectively.

Brightness for each of the lamps differs from each other in accordance with a temperature distribution of the receiving space.

According to the present invention, although a surrounding temperature at an upper portion of the backlight assembly is higher than a surrounding temperature at a lower portion of the backlight assembly, the liquid crystal display apparatus may provide uniform brightness, thereby preventing deterioration of display quality thereof.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE PREFERRED EMBODIMENT

Hereinafter, the present invention will be explained in detail with reference to the accompanying drawings.

Embodiments of backlight assembly

186 Embodiment 1

Figure 1:
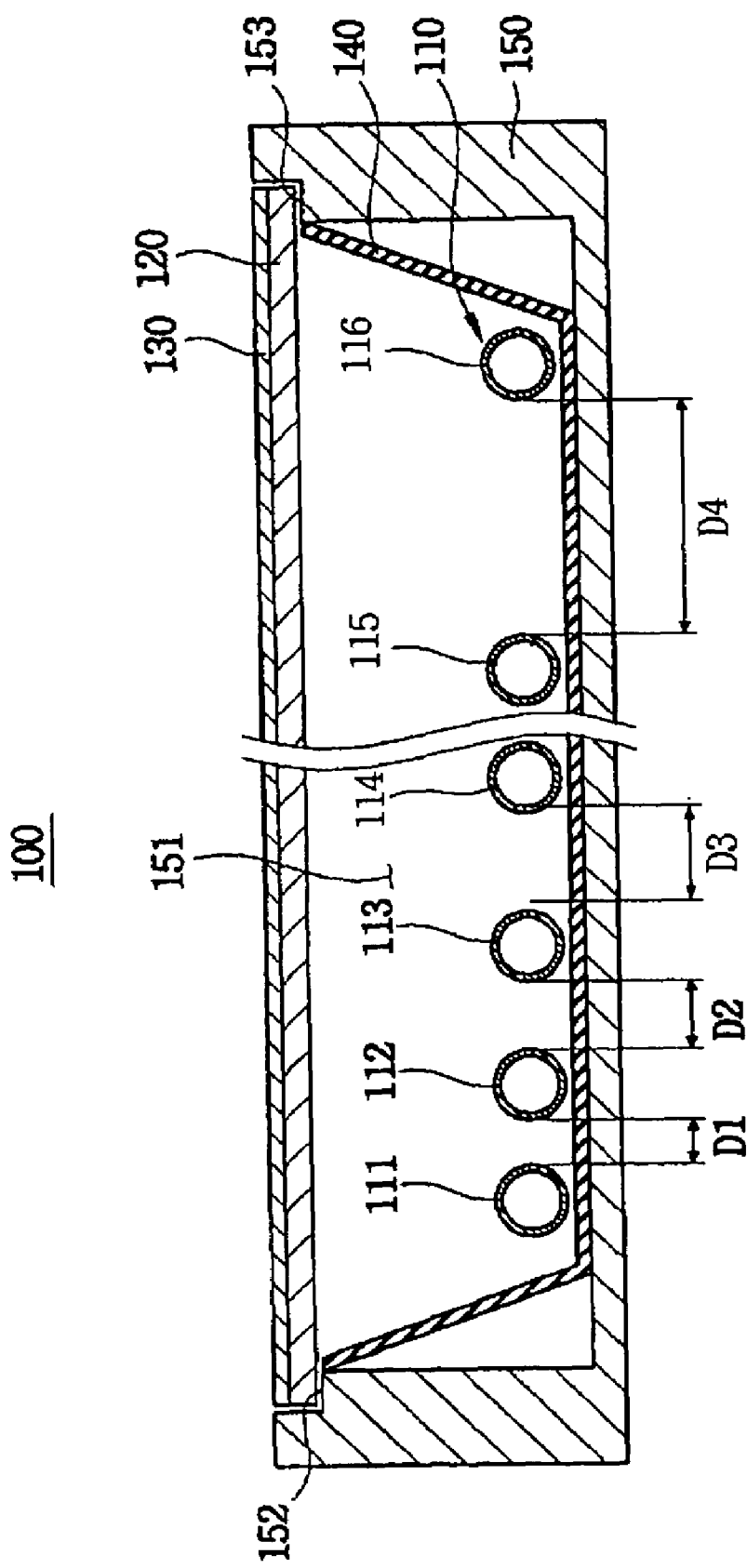
FIG. 1 is a cross-sectional view showing a backlight assembly according to a first exemplary embodiment of the present invention.

FIG. 1 is a cross-sectional view showing a backlight assembly according to a first exemplary embodiment of the present invention.

Referring to FIG. 1, a backlight assembly 100 according to a first exemplary embodiment of the present invention includes a plurality of lamps 110 that emits a first light, a diffusion plate 120 disposed on the lamps 110 to diffuse the first light, an optical sheet 130 disposed on the diffusion plate 120 to collect the light from the diffusion plate 120, a reflection plate 140 disposed under the lamps 110 to reflect the first light to the diffusion plate 120, and a receiving container 150 that provides a receiving container 150 so as to successively receive the reflection plate 140, the lamps 110, the diffusion plate 120 and the optical sheet 130.

In order to provide the receiving space 151, the receiving container 150 includes a bottom surface and a sidewall extended to a direction substantially perpendicular to the bottom surface from an edge of the bottom surface.

Particularly, each of the lamps 110 has a tube shape, and emits the first light in response to a discharge voltage that is externally provided. Each of the lamps 110 includes a lamp tube that a fluorescent material is coated onto an inner surface of the lamp tube, and a discharge gas is injected into the lamp tube. The discharge gas includes at least two gases of mercury (Hg), neon (Ne), argon (Ar), krypton (Kr) and xenon (Xe) to be injected into the lamp tube. When the discharge gas is applied to the lamps 110, the neon (Ne), argon (Ar), krypton (Kr) and xenon (Xe) are ionized to generate an electron. The mercury (Hg) generates an ultraviolet ray having a wavelength shorter than that of a visual ray in response to the electron, and the fluorescent material converts the ultraviolet ray into the visual ray.

Figure 3:
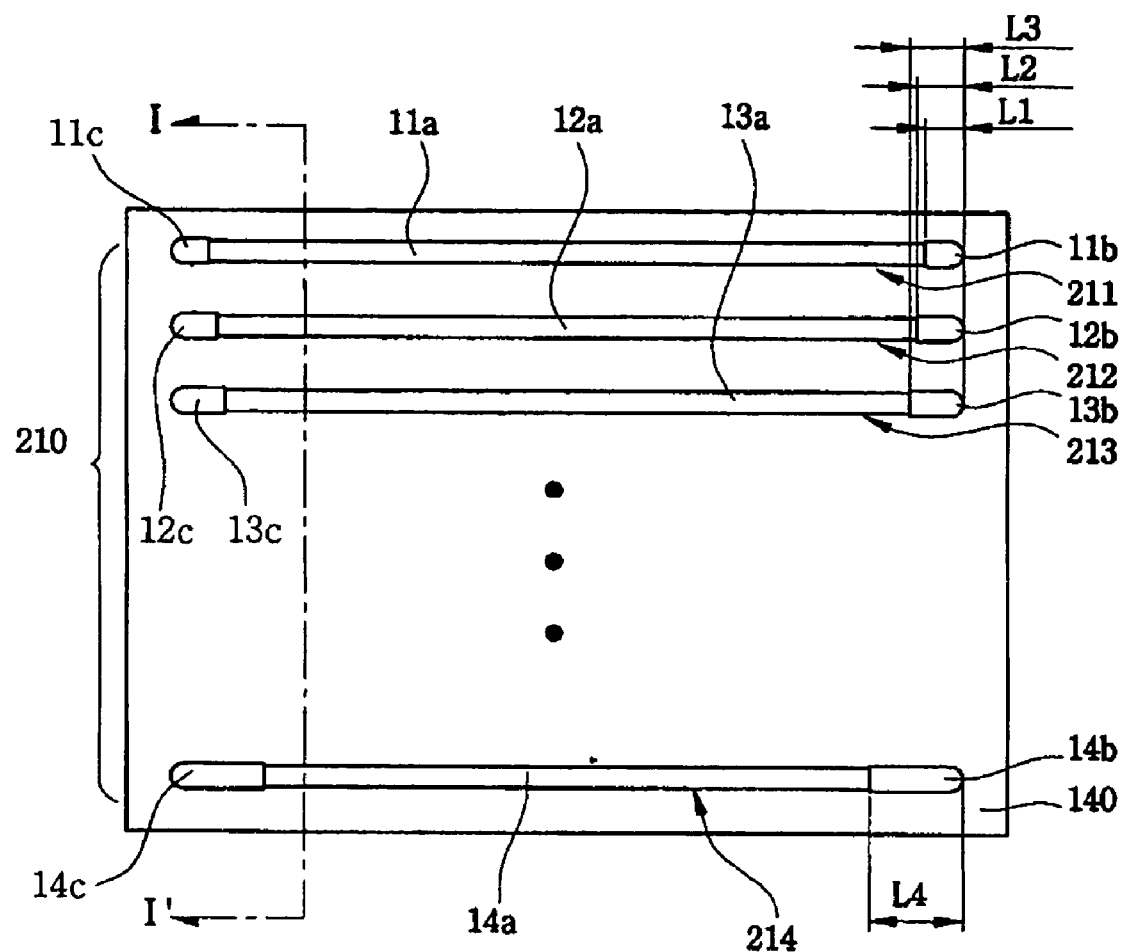
FIG. 3 is a plane view showing a backlight assembly according to a second exemplary embodiment of the present invention.

Although not shown in FIG. 1, each of the lamps 110 includes external electrodes formed at both ends of the lamp tube (refer to FIG. 3).

Particularly, the external electrodes are formed at outer surfaces of the both ends of the lamp tube, respectively. The external electrodes are coupled to the lamp so as to allow the outer surfaces to be covered, and fixed to the lamp tube by a conductive adhesive disposed between the external electrodes and the lamp tube.

The lamps 110 is horizontally disposed on the bottom surface of the receiving container 150, and arranged in parallel to each other on the bottom surface of the receiving container 150 when the backlight assembly 100 is used such that a second end of the backlight assembly 100 is farther spaced apart from a ground than a first end of the backlight assembly 100.

In the first exemplary embodiment of the present invention, the lamps 110 are spaced apart from each other by various intervals so as to uniformly maintain a temperature distribution inside the receiving container 150.

Particularly, the interval between the lamps 110 that is horizontally arranged gradually increases from the first end of the backlight assembly 100 to the second end of the backlight assembly 100 while the backlight assembly 100 is used such that the second end of the backlight assembly 100 is farther spaced apart from the ground than the first end of the backlight assembly 100. In this exemplary embodiment, when the backlight assembly 100 vertically stands against the ground, the second end indicates an upper portion in view of a user and the first end indicates a lower portion nearer to the ground than the upper portion in view of the user.

For example, in case that the lamps 110 include a first lamp 111, a second lamp 112, a third lamp 113, a fourth lamp 114, a fifth lamp 115 and a sixth lamp 116, and the first to sixth lamps 111, 112, 113, 114, 115 and 116 are successively arranged on the bottom surface of the receiving space 151 from the first end, intervals between the first to sixth lamps 111, 112, 113, 114, 115 and 116 are different from each other.

That is, the second lamp 112 that is adjacent to the first lamp 111 is spaced apart from the first lamp 111 by a first interval D1, and the third lamp 113 that is adjacent to the second lamp 112 is spaced apart from the second lamp 112 by a second interval D2 wider than the first interval D1. In a same manner as above, the fourth lamp 114 that is adjacent to the third lamp 113 is spaced apart from the third lamp 113 by a third interval D3 wider than the second interval D2, and the sixth lamp 116 that is adjacent to the fifth lamp 115 is spaced apart from the fifth lamp 115 by a fourth interval D4 wider than the third interval D3.

In case of arranging the first to sixth lamps 111, 112, 113, 114, 115 and 116 as described above, number of lamps disposed in an area adjacent to the second end of the receiving space 151 is smaller than number of lamps disposed in area adjacent to the first end of the receiving space 151. Thus, since a heat amount generated from the second end of the receiving space 151 is reduced, a temperature difference between the first end and the second end of the receiving space 151 may be reduced. As a result, the temperature distribution inside the receiving space 151 may be uniform, so that the backlight assembly 100 may provide uniform brightness thereof.

The diffusion plate 120 and the optical sheet 130 are successively disposed on the receiving container 150 into which the lamps 110 are received such that the diffusion plate 120 faces the lamps 110. The diffusion plate 120 is spaced apart from the lamps 110 by a predetermined interval. The diffusion plate 120 diffuses the first light emitted from the lamps 110, and the optical sheet 130 collects the first light from the diffusion plate 120 so as to emit the second light having a uniform brightness distribution. Thus, the backlight assembly 100 may prevent occurrence of a bright line between the lamps 110 spaced apart from each other by the various intervals.

The reflection plate 140 on which the lamps 110 are disposed reflects the first light emitted from the lamps 110 toward the bottom surface of the receiving container 150 back to the diffusion plate 120 so as to improve a light efficiency.

The receiving container 150 receives the reflection plate 140, the lamps 110, the diffusion plate 120 and the optical sheet 130. The receiving container 150 includes step portions 152 and 153 formed at an upper portion of the sidewall of the receiving container 150 so as to support the diffusion plate 120 and the optical sheet 130.

In this exemplary embodiment; the receiving container 150 includes a metal material such as aluminum, aluminum alloy, etc., so as to rapidly discharge the heat generated from the lamps 110.

Although not shown in FIG. 1, when the receiving space 151 is divided into a plurality of areas, lamps disposed in a same area of the areas may be spaced apart from each other by a substantially identical interval. Intervals between the lamps disposed in an area adjacent to the second end of the receiving container 150 are greater than intervals between the lamps disposed in an area adjacent to the first end of the receiving container 150.

Figure 2:
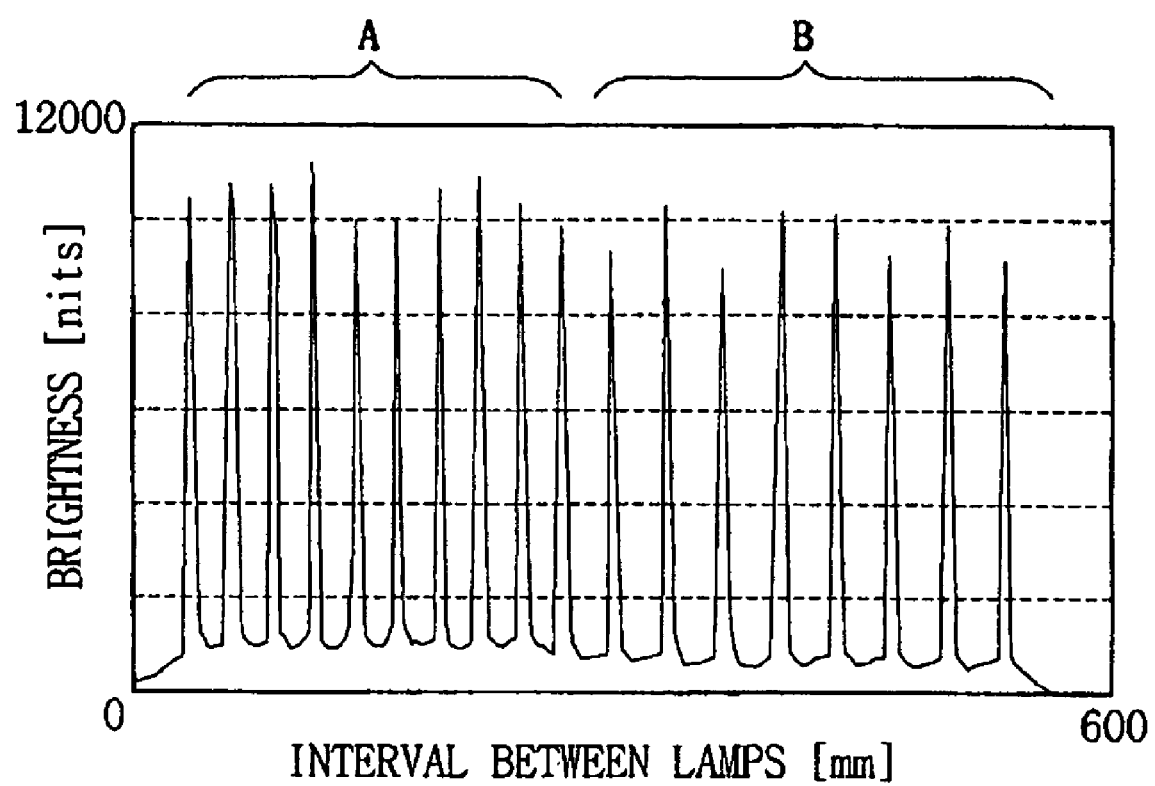
FIG. 2 is a graph showing a brightness distribution according to intervals between the lamps shown in FIG. 1.

FIG. 2 is a graph showing a brightness distribution according to intervals between the lamps shown in FIG. 1. In FIG. 2, each peak represents the brightness of each lamp.

Referring to FIG. 2, in case of measuring the brightness distribution after arranging the lamps by various intervals between the lamps, high brightness has been resulted at an area where the intervals between the lamps are narrow.

Particularly, a first brightness distribution has been measured when the lamps are disposed in a first interval, and a second brightness distribution has been measured when the lamps are disposed in a second interval wider than the first interval.

When the first brightness distribution of a first lamp group (A) disposed in the first interval has been compared with the second brightness distribution of a second lamp group (B) disposed in the second interval, the first brightness distribution of the first lamp group (A) has been higher than the second brightness distribution of the second lamp group (B).

Thus, when the intervals between the lamps adjacent to the first end of the receiving container 150, is narrower than the intervals between the lamps adjacent to the second end of the receiving container 150 more number of the lamps may be disposed in the area adjacent to the first end than number of the lamps disposed in the area adjacent to the second end. Therefore, although the temperature of the area adjacent to the second end that is farther spaced apart from the ground than the first end increases, the temperature distribution inside the receiving space 150 may be uniformly maintained. Accordingly, the backlight assembly 100 may uniformly maintain the brightness distribution of the receiving space 150.

Embodiment 2

Figure 4:
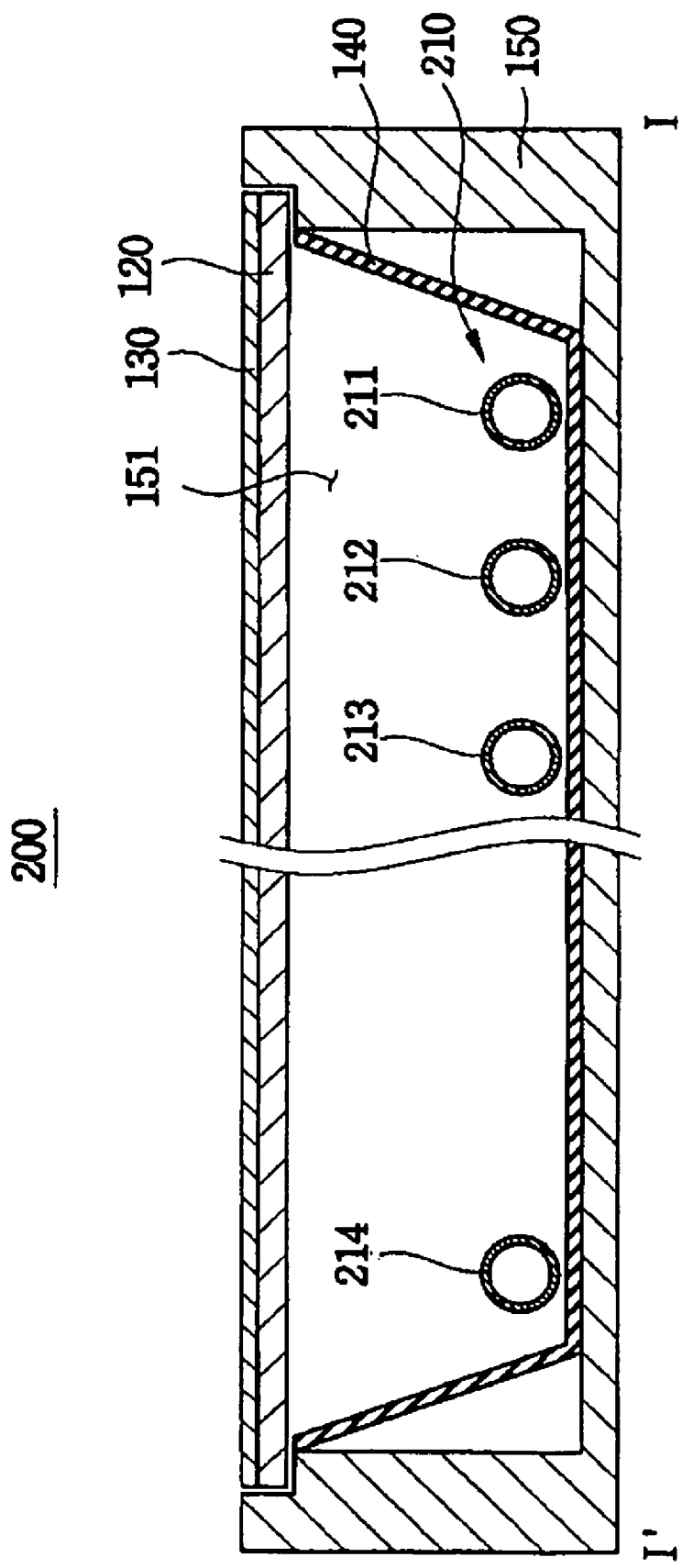
FIG. 4 is a cross-sectional view taken along the line I–I' of FIG. 3.

FIG. 3 is a plane view showing a backlight assembly according to a second exemplary embodiment of the present invention. FIG. 4 is a cross-sectional view taken along the line I–I' of FIG. 3. In FIGS. 3 and 4, the same reference numerals denote the same elements in FIG. 1, and thus the detailed descriptions of the same elements will be omitted.

Referring to FIGS. 3 and 4, a backlight assembly 200 includes a receiving container 150, a reflection plate 140, a plurality of lamps 210, a diffusion plate 120 and an optical sheet 130.

The reflection plate 140 is received into a receiving space 151 of the receiving container 150, and the lamps 210 are disposed on the reflection plate 140. The lamps 210 are spaced apart from each other by a substantially identical interval. The lamps 210 include a first lamp 211, a second lamp 212, a third lamp 213 and a fourth lamp 214. Number of the lamps 210 may increase or decrease depending upon a size of a liquid crystal display panel (not shown) disposed on the receiving container 150.

In this exemplary embodiment, the first, second, third and fourth lamps 211, 212, 213 and 214 include first, second, third and fourth lamp tubes 11a, 12a, 13a and 14a into which a discharge gas is injected, respectively. The first lamp 211 includes a first electrode 11b and a second electrode 11c formed respectively at both end portions thereof. The second lamp 212 includes a first electrode 12b and a second electrode 12c formed respectively at both end portions thereof The third lamp 213 includes a first electrode 13b and a second electrode 13c formed respectively at both end portions thereof. The fourth lamp 214 includes a first electrode 14b and a second electrode 14c formed respectively at both end portions thereof. The first and second electrodes 11b, 11c, 12b, 12c, 13b, 13c, 14b and 14c of the first to fourth lamps 211, 212, 213 and 214 are formed on an outer surface of the first to fourth lamp tubes 11a, 12a, 13a, 14a, respectively.

Particularly, when the backlight assembly 200 is used such that the second end of the backlight assembly 200 is farther spaced apart from the ground than the first end of the backlight assembly 200, the first lamp 211 of the lamps 210 is disposed at a position adjacent to the second end of the receiving space 151 and the fourth lamp 214 is disposed at a position adjacent to the first end of the receiving space 151. The second and third lamps 212 and 213 are disposed between the first and fourth lamps 211 and 214. In this exemplary embodiment, each of the first to fourth lamps 211, 212, 213 and 214 is spaced apart from an adjacent lamp by a substantially identical interval between the lamps.

The first and second electrodes 11b and 11c of the first lamp 211 are respectively extended from a first end portion and a second end portion of the first lamp 211 to a center portion of the first lamp 211 by a first length L1. The first and second electrodes 12b and 12c of the second lamp 212 are respectively extended from a first end portion and a second end portion of the second lamp 212 to a center portion of the second lamp 212 by a second length L2 longer than the first length L1. The first and second electrodes 13b and 13c of the third lamp 213 are respectively extended from a first end portion and a second end portion of the third lamp 213 to a center portion of the third lamp 213 by a third length L3 longer than the second length L2. The first and second electrodes 14b and 14c of the fourth lamp 214 are respectively extended from a first end portion and a second end portion of the fourth lamp 214 to a center portion of the fourth lamp 214 by a fourth length L4 longer than the third length L3.

That is, a length of the electrodes of each lamps 210 is gradually shortened from the first end to the second end so as to allow an area of the electrodes of each lamps 210 to be increased while the backlight assembly 200 is used such that the second end of the backlight assembly 200 is farther spaced apart from the ground than the first end of the backlight assembly 200.

Particularly, the second lamp 212 has a tube current higher than a tube current of the first lamp 211, the third lamp 213 has a tube current higher than the tube current of the second lamp 212, and the fourth lamp 214 has a tube current higher than the tube current of the third lamp 213. Thus, the brightness of the lamps 210 is gradually enhanced from the second end to the first end of the backlight assembly 200. Further, an inner temperature of the receiving space 151 gradually increases from the first end to the second end of the backlight assembly 200 due to convection of the heat.

Therefore, although the inner temperature of the second end of the receiving container 150 is higher than the inner temperature of the first end of the receiving container 150 due to the heat generated from the lamps 210 so that the brightness of lamps disposed in the area adjacent to the second end is enhanced, the backlight assembly 200 may provide uniform brightness. This is because the brightness of the lamps 210 is gradually enhanced from the second end to the first end in accordance with variation of the tube current of the first to fourth lamps 211, 212, 213 and 214.

That is, since an initial brightness of the fourth lamp 214 is higher than an initial brightness of the first lamp 211, the brightness distribution of the receiving space 151 may be uniformly maintained even though the brightness of the first lamp 211 is enhanced due to an increase of the inner temperature at the area adjacent to the second end.

Embodiment 3

Figure 5:
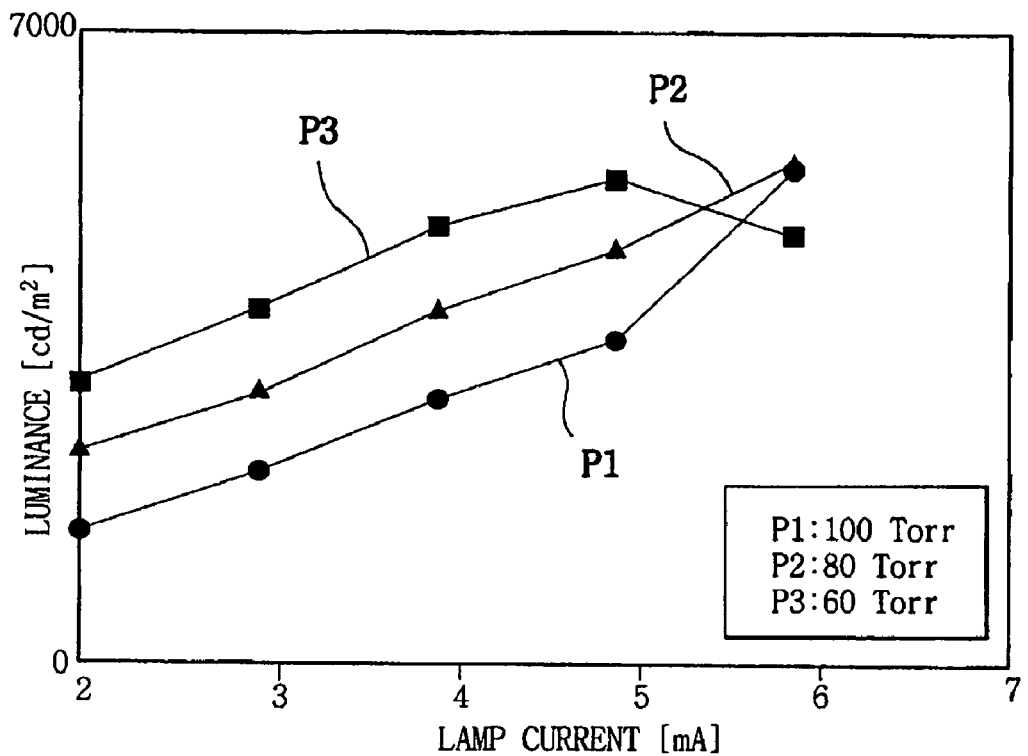
FIG. 5 is a graph showing a brightness distribution in accordance with an amount of a discharge gas injected into the lamps shown in FIG. 3.

FIG. 5 is a graph showing a brightness distribution in accordance with an amount of a discharge gas injected into the lamps shown in FIG. 3.

In this exemplary embodiment, a backlight assembly 200 includes a receiving container 150 providing a receiving space 151, a reflection plate 140 received into the receiving space 151, first to fourth lamps 211, 212, 213 and 214 disposed on a bottom surface of the reflection plate 140, a diffusion plate 120 disposed on the first to fourth lamps 211, 212, 213 and 214 and an optical sheet 130 disposed on the diffusion plate 120. In FIG. 5, the same reference numerals denote the same elements in FIG. 1, and thus the detailed descriptions of the same elements will be omitted. The first to fourth lamps 211, 212, 213 and 214 are disposed on the bottom surface of the reflection plate 140, and spaced apart from each other by a substantially identical interval between the lamps. The first lamp 211 is disposed at a position adjacent to a second end that is farther spaced apart from a ground than a first end of the backlight assembly 200, the fourth lamp 214 is disposed at a position adjacent to the first end, and the second and third lamps 212 and 213 are disposed between the first and fourth lamps 211 and 214.

In this exemplary embodiment, the first, third and fourth lamps 211, 213 and 214 will be described in detail.

Referring to FIG. 5, different amount of the discharge gas is injected into each of the first, third and fourth lamps 211, 213 and 214. That is, the discharge gas is injected into each of the first, third and fourth lamps 211, 213 and 214 such that the first, third and fourth lamps 211, 213 and 214 have a first inner pressure P1, a second inner pressure P2 and a third inner pressure P3, respectively. In other words, an amount of the discharge gas injected into the third lamp 213 is greater than an amount of the discharge gas injected into the fourth lamp 214, and an amount of the discharge gas injected into the first lamp 211 is greater than an amount of the discharge gas of the third lamp 213.

More particularly, the first, second and third inner pressures P1, P2 and P3 of the first, third and fourth lamps 211, 213 and 214 are about 100 torr, about 80 torr and about 60 torr, respectively. In consideration of brightness variation of the first, third and fourth lamps 211, 213 and 214 while the first, third and fourth lamps 211, 213 and 114 are turned on, the tube current flowing through the fourth lamp 214 is greater than those of the first and third lamps 211 and 213. Thus, the fourth lamp 214 has a brightness variation greater than the first and third lamps 211 and 213.

Especially, in case that each of the first, third and fourth lamps 211, 213 and 214 has the tube current from about 5 milliamperes to about 6 milliamperes, the brightness of the fourth lamp 214 having the third inner pressure P3 of about 60 torr is higher than the brightness of the first lamp 211 having the first inner pressure P1 of about 100 torr. When the tube current is from about 5 milliamperes to about 6 milliamperes, a lamp have an inner pressure that gradually increases in accordance with an increase of the discharge gas injected into the lamp, so that the lamp may have brightness higher than a lamp having a low inner pressure.

Thus, in case that the backlight assembly 200 is used so as to allow the second end of the backlight assembly 200 to be farther spaced apart from the ground than the first end of the backlight assembly 200, the backlight assembly 200 may maintain the brightness distribution in uniform even though an increase of temperature at an area adjacent to the second end is greater than an increase of temperature at an area adjacent to the first end. This is because an increase of the brightness of the fourth lamp 214 disposed in the area adjacent to the first end is greater than an increase of the brightness of the first lamp 211 disposed in the area adjacent to the second end.

Embodiment 4

In the third exemplary embodiment, different amount of the discharge gas is injected into each of the first, third and fourth lamps 211, 213 and 214 so as to uniformly maintain the brightness of the lamps 210. However, although each of the lamps 210 has a substantially identical amount of the discharge gas, the brightness distribution of the backlight assembly 200 might be uniformly maintained by adjusting a ratio between a neon gas (Ne) and an argon gas (Ar). Alternatively, the discharge gas such as mercury (Hg), krypton (Kr) and xenon (Xe) may be further injected into the lamps 210.

Figure 6:
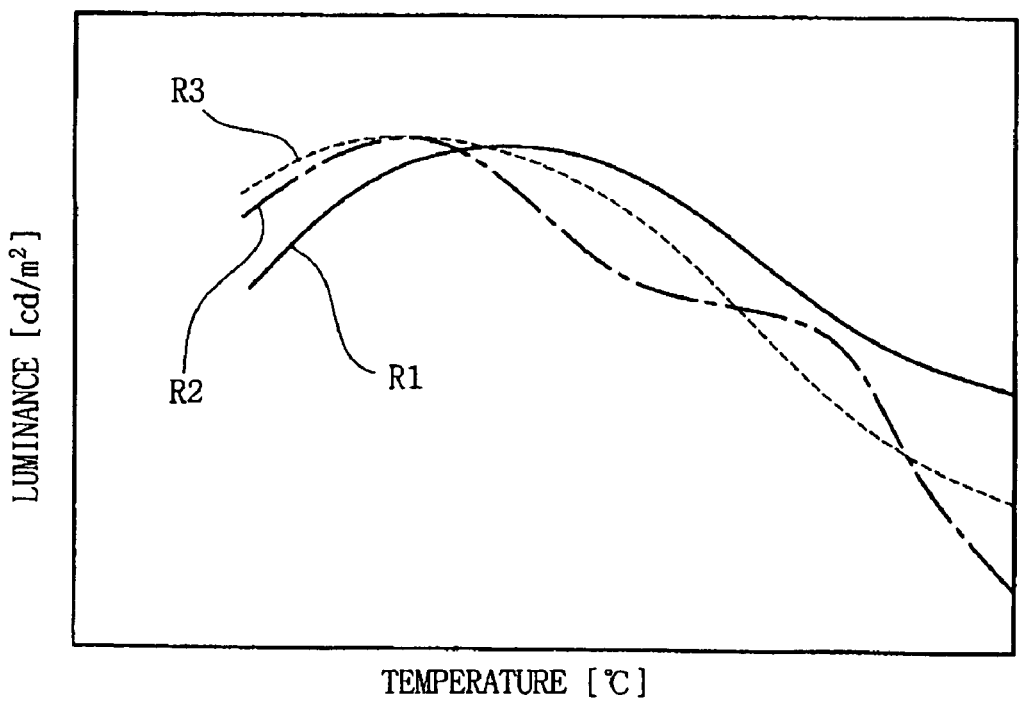
FIG. 6 is a graph showing a brightness distribution of a lamp in accordance with a ratio between a neon gas and an argon gas among a discharge gas injected into the lamps shown in FIG. 3.

FIG. 6 is a graph showing a brightness distribution of a lamp in accordance with a ratio between a neon gas and an argon gas among a discharge gas injected into the lamps shown in FIG. 3.

In this exemplary embodiment, a backlight assembly 200 includes a receiving container 150 providing a receiving space 151, a reflection plate 140 received into the receiving space 151, first to fourth lamps 211, 212, 213 and 214 arranged on a bottom surface of the reflection plate 140, a diffusion plate 120 disposed on the first to fourth lamps 211, 212, 213 and 214, and an optical sheet 130 disposed on the diffusion plate 120. In FIG. 6, the same reference numerals denote the same elements in FIG. 1, and thus the detailed descriptions of the same elements will be omitted.

The first, second, third and fourth lamps 211, 212, 213 and 214 are disposed on the bottom surface of the reflection plate 140, and spaced apart from an adjacent lamp by a substantially identical interval between the lamps. The first lamp 211 is disposed in an area adjacent to a second end of the backlight assembly 200, which is farther spaced apart from a ground than a first end of the backlight assembly 200. The fourth lamp 214 is also disposed in the area adjacent to the first end of the backlight assembly 200. The second and third lamps 212 and 213 are disposed between the first and fourth lamps 211 and 214.

In this exemplary embodiment, the first, third and fourth lamps 211, 213 and 214 will be described in detail.

Referring to FIG. 6, the discharge gas has been injected into the first, third and fourth lamps 211, 213 and 214 such that each of the first, third and fourth lamps 211, 213 and 214 has a different ratio between the neon gas and the argon gas.

Particularly, a first ratio R1 between the neon gas and the argon gas of the first lamp 211 is 60:40, a second ratio R2 between the neon gas and the argon gas of the third lamp 213 is 97:3, and a third ratio R3 between the neon gas and the argon gas is 99:1.

In consideration of the brightness of the first, third and fourth lamps 211, 213 and 214 in accordance with a variation of inner temperature of the receiving space 151, the fourth lamp 214 disposed in the area adjacent to the first end has a brightness that increases in accordance with an increase of the inner temperature. On the contrary, the first lamp 211 disposed in the area adjacent to the second end has a brightness that decreases in accordance with the increase of the inner temperature. That is, when amount of the argon gas injected into each of the first, third and fourth lamps 211, 213 and 214 increases, a brightness of lamps 210 including the first, third and fourth lamps 211, 213 and 214 decreases.

Thus, in case that the inner temperature of the receiving space 151 of the backlight assembly 200 does not exceed the inner temperature of about 50 degrees, the fourth lamp 214 disposed in the area adjacent to the first end has the highest brightness among the first, third and fourth lamps 211, 213 and 214. Therefore, although the brightness of the first lamp 211 increases due to the increase of the inner temperature at the area adjacent to the second end, the backlight assembly 200 may uniformly maintain the brightness distribution between the first and second ends of the receiving container 150.

As shown in FIG. 6, in case that the inner temperature of the receiving space 151 of the backlight assembly 200 exceeds the inner temperature of about 50 degrees, the brightness of the lamps 210 has been lowered in accordance with a decrease of the amount of the argon gas (Ar).

Thus, if the inner temperature of the receiving container 150 may be risen over about 50 degrees due to a surrounding environment of the backlight assembly 200, it is preferable that the amount of the neon gas increases and the amount of the argon gas decreases from the first end to the second end of the backlight assembly, 200

Embodiment of liquid crystal display apparatus

Figure 7:
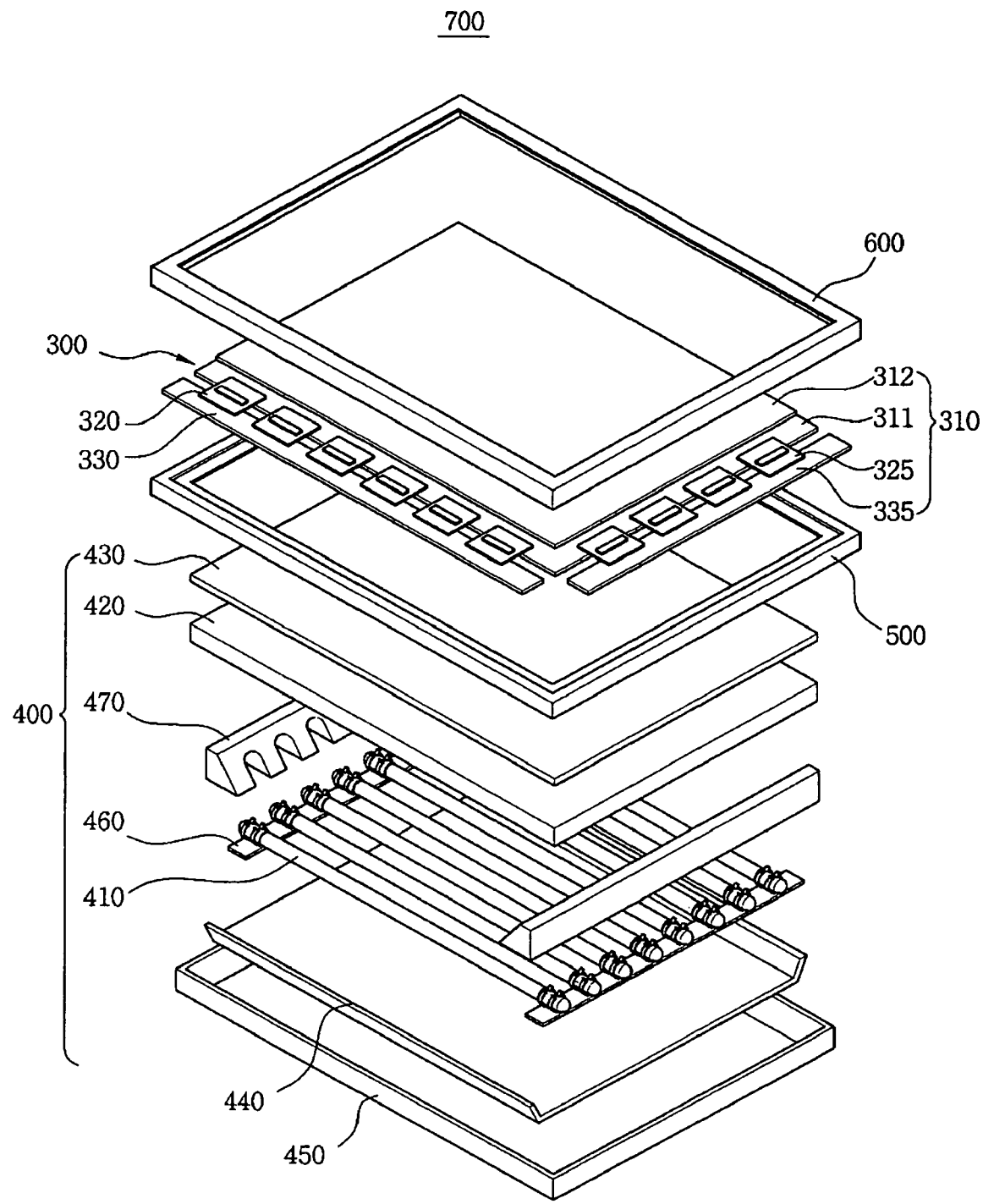
FIG. 7 is an exploded perspective view showing a liquid crystal display apparatus according to an exemplary embodiment of the present invention.

FIG. 7 is an exploded perspective view showing a liquid crystal display apparatus according to an exemplary embodiment of the present invention.

Referring to FIG. 7, a liquid crystal display apparatus 700 according to an exemplary embodiment of the present invention includes a liquid crystal display panel assembly 300 that displays an image, a backlight assembly 400 that supplies light to the liquid crystal display panel assembly 300, a middle chassis 500 disposed between the liquid crystal display panel assembly 300 and the backlight assembly 400, and a top chassis 600.

The liquid crystal display panel assembly 300 includes a liquid crystal display panel 310 that displays the image using the liquid crystal and the light, a data tape carrier package (data TCP) 320 and a gate TCP 325, and a data printed circuit board (data PCB) 330 and a gate PCB 335. The liquid crystal display panel 310 includes a thin film transistor (TFT) substrate 311, a color filter substrate 312 facing the TFT substrate 311, and a liquid crystal layer (not shown) disposed between the TFT substrate 311 and the color filter substrate 312.

The TFT substrate 311 is a transparent substrate having data and gate lines formed therein and a TFT (not shown) formed as in a matrix configuration.

The color filter substrate 312 facing the TFT substrate 311 includes red, green and blue pixels formed by a thin film process. The red, green and blue pixels express a predetermined color using the light provided from the backlight assembly 400.

The data TCP 320 is electrically connected to a source side of the TFT substrate 311 so as to determine an applying timing of a data driving signal. The gate TCP 325 is electrically connected to a gate side of the TFT substrate 311 so as to determine an applying timing of a gate driving signal.

The data TCP 320 includes a first end attached to the TFT substrate 311 and a second end attached to the data PCB 330 so that the liquid crystal display panel 310 is electrically connected to the data PCB 330 via the data TCP 320. The gate TCP 325 includes a first end attached to the TFT substrate 311 and a second end attached to the gate PCB 335 so that the liquid crystal display panel 310 is electrically connected to the gate TCP 325.

The data and gate PCBs 330 and 335 receive an electrical signal externally provided, and apply the received electrical signal to the data and gate TCPs 320 and 325, respectively. The data and gate TCPs 320 and 325 also apply the driving signal and the timing signal to the liquid crystal display panel 310 so as to control the driving and driving timing of the liquid crystal display panel 310.

The backlight assembly 400 is disposed under the display unit 300. The backlight assembly 400 includes a plurality of lamps 410 that emits a first light, a conductive clip 460 that receives both ends of the lamps 410 and provides an externally-provided power to the lamps 410 so as to drive the lamps 410 in parallel, a mold frame 470 that receives the both ends of the lamps 410 inserted into the conductive clip 460, a diffusion plate 420 that diffuses the first light and emits a second light having a uniform brightness distribution, an optical sheet 430 disposed on the diffusion plate 420, a reflection plate 440 that reflects the first light leaked from the lamps 410 back to the diffusion plate 420, and a receiving container 450 that sequentially receives the reflection plate 440, conductive clip 460, lamps 410, mold frame 470, diffusion plate 420 and optical sheet 430.

Particularly, the lamps 410 having a tube shape are horizontally disposed in the receiving space of the receiving container 450 so as to emit the first light. Each of the lamps 410 includes external electrodes formed at both ends of the lamp tube. The external electrodes are formed at outer surfaces of the both ends of the lamp tube, respectively. The external electrodes are coupled to the lamp so as to allow the outer surfaces to be covered, and fixed to the lamp tube by a conductive adhesive disposed between the external electrodes and the lamp tube. That is, each of the lamps 410 includes an external electrode fluorescent lamp (EEFL).

The lamps 410 are arranged in parallel to each other. The lamps 410 emit the first light together with a fluorescent material coated on inner surface of the lamps 410 and a discharge gas such as a neon gas, an argon gas, mercury, etc. The lamps 410 disposed in the receiving space irradiate the first light over the liquid crystal display panel 310.

When the lamps 410 are operated, a temperature at an area adjacent to an upper portion of the receiving space may be higher than a temperature at an area adjacent to a lower portion of the receiving space due to heat generated from the lamps 410. In this exemplary embodiment, the upper portion of the receiving space is farther spaced apart from a ground than the lower portion of the receiving space.

In order to prevent deterioration of the brightness of the receiving space as the temperature of the upper portion is higher than the temperature of the lower portion, the lamps 410 are disposed in the receiving space such that the lamps 410 are spaced apart from each other by various intervals between the lamps 410. That is, an interval between the lamps disposed in the area adjacent to the lower portion of the receiving space is narrower than an interval between the lamps disposed in the area adjacent to the upper portion of the receiving space.

As another exemplary embodiment, each of the lamps 410 may have a different brightness depending upon positions at which the lamps 410 are disposed so as to make the brightness distribution to be uniform.

As a method of differentiating the brightness of each lamps 410, a method of adjusting a length of an electrode formed on an outer surface of the each lamps 410, a method of differentiating an inner pressure of the each lamps 410, and a method of controlling a ratio between discharge gases injected into the each lamps 410 have been presented as described above.

As shown in FIG. 3, the length of each of the lamps 410 is gradually shortened from the lower portion of the receiving space to the upper portion of the receiving space. In this exemplary embodiment, the length indicates a length extended from an end of each of the lamps 410 to a center portion of each of the lamps 410. Thus, the lamps disposed in the area adjacent to the lower portion have a higher brightness than the lamps disposed in the area adjacent to the upper portion.

In order to differentiate the inner pressure of each of the lamps 410, an amount of the discharge gas injected into the lamps gradually increases from the lower portion of the receiving space to the upper portion of the receiving space. When the inner pressure of the lamps disposed in the area adjacent to the upper portion increases in accordance with the amount of the discharge gas injected into the lamps 410, the lamps disposed in the area adjacent to the lower portion have brightness higher than the lamps disposed in the area adjacent to the upper portion. In this exemplary embodiment, each of the lamps 410 has a tube current of about 5 milliamperes to about 6 milliamperes.

In case of differentiating the ratio between the lamps 410, the argon gas injected into the lamps 410 gradually increases from the lower portion of the receiving space to the upper portion of the receiving space. When the surrounding temperature of the lamps 410 increases, the lamps disposed in the area adjacent to the upper portion have brightness higher than the lamps disposed in the area adjacent to the lower portion. When the surrounding temperature of the lamps 410 decreases, the lamps disposed in the area adjacent to the lower portion have brightness higher than the lamps disposed in the area adjacent to the upper portion.

Thus, when the argon gas injected into the lamps gradually increases from the lower portion to the upper portion, the liquid crystal display panel 310 may uniformly maintain the brightness even though the surrounding temperature at the area adjacent to the upper portion increases.

The diffusion plate 420 and the optical sheet 430 are disposed between the lamps 410 and the liquid crystal display panel 310. The diffusion plate 420 and the optical sheet 430 diffuse the first light generated from the lamps 410 so as to emit the second light to the liquid crystal display panel 310.

The reflection plate 440 is disposed under the lamps 410. The reflection plate 440 reflects the first light leaked from the lamps 410 back to the diffusion plate 420.

The mold frame 470 is disposed between the reflection plate 440 and the diffusion plate 420 so as to receive the lamps 410 and the conductive clip 460.

The receiving container 450 is disposed under the reflection plate 440. The receiving container 450 provides the receiving space defined by a bottom surface and a sidewall extended from the bottom surface so as to receive the reflection 440 and the lamps 410 into the receiving space. The receiving container 450 further includes step portions formed at an upper portion of the sidewall so as to receive the diffusion plate 420 and the optical sheet 430 thereon. In consideration of the heat generated from the lamps 410, the receiving container 450 includes a metal material such as aluminum, aluminum alloy and so on.

The middle chassis 500 is disposed between the liquid crystal display panel 310 and the optical sheet 430. The middle chassis 500 includes a bottom surface partially opened and a sidewall extended from an end of the bottom surface. The middle chassis 500 is coupled to the receiving container 450 so that the diffusion plate 420 and the optical sheet 430 are fixed to the receiving container 450. The data and gate TCPs 320 and 325 are outwardly bent along the sidewall of the middle chassis 500. The data and gate PCBs 330 and 335 electrically connected to the data and gate TCPs 320 and 325, respectively, are disposed on a rear surface of the liquid crystal display panel 310 through the opened bottom surface of the middle chassis 500.

The top chassis 600 disposed on the liquid crystal display panel 310 is coupled to the receiving container 450 so as to fix the liquid crystal display panel 310 to the middle chassis 500. The top chassis 600 partially covers the liquid crystal display panel 310 such that an effective display area of the liquid crystal display panel 310 is exposed.

According to the backlight assembly and the liquid crystal display apparatus, the lamps are spaced apart from each other by various intervals between the lamps, so that the temperature distribution and the brightness distribution between the upper and lower portions of the liquid crystal display panel may be uniformly maintained.

Furthermore, each of the lamps may have the brightness different from each other depending upon positions at which the lamps are disposed, thereby uniformly maintaining the brightness distribution of the liquid crystal display panel. Thus, the liquid crystal display apparatus may prevent deterioration of display quality thereof.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
a receiving container to provide a receiving space; and
a plurality of lamps received into the receiving space in parallel to each other, wherein an interval between the lamps gradually increases from a first end of the receiving container to a second end substantially parallel to the first end of the receiving container.

2. The backlight assembly of claim 1, wherein the receiving container comprises a bottom surface and a sidewall extended from an edge of the bottom surface to provide the receiving space, and the lamps are disposed on the bottom surface of the receiving container.

3. The backlight assembly of claim 2, wherein the first end of the receiving container is disposed at a position lower than a position of the second end of the receiving container.

4. A backlight assembly comprising:
a receiving container to provide a receiving space; and
a plurality of lamps received into the receiving space in parallel to each other, each of the lamps having different brightness from each other in accordance with temperature distribution of the receiving space, the brightness of each of the lamps being inversely proportional to the temperature distribution of the receiving space to provide uniforms brightness from the backlight assembly.

5. The backlight assembly of claim 4, wherein each of the lamps comprises:
a lamp tube into which a discharge gas is injected;
a first electrode disposed at a first end portion of the lamp tube; and
a second electrode disposed at a second end portion of the lamp.

6. The backlight assembly of claim 5, wherein the first electrode is formed on an outer surface of the first end portion of the lamp tube, and
wherein an area of the first electrode gradually decreases from a first end of the receiving container to a second end of the receiving container, which is substantially parallel to the first end of the receiving container.

7. The backlight assembly of claim 6, wherein the first end of the receiving container is disposed at a position lower than a position of the second end of the receiving container.

8. The backlight assembly of claim 5, wherein a different amount of the discharge gas is injected into each of the lamps.

9. The backlight assembly of claim 8, wherein the amount of the discharge gas gradually increases from the first end of the receiving container to the second end of the receiving container, which is substantially parallel to the first end, and each of the lamps comprises a tube current of about 5 to about 6 milliamperes.

10. The backlight assembly of claim 9, wherein the first end of the receiving container is disposed at a position lower than a position of the second end of the receiving container.

11. The backlight assembly of claim 5, wherein the discharge gas comprises at least an argon gas and a neon gas.

12. The backlight assembly of claim 11, wherein a ratio between the argon gas and the neon gas injected into each of the lamps is different from each other.

13. The backlight assembly of claim 12, wherein an amount of the neon gas injected into the lamps gradually decreases from the first end to the second end, which is substantially parallel to the first end,
wherein an amount of the argon gas injected into the lamps gradually increases from the first end to the second end, and
wherein an inner temperature of the receiving container is lower than about 50 degrees in Celcius.

14. The backlight assembly of claim 4, further comprising a diffusion member disposed on the lamps so as to diffuse light emitted from the lamps, thereby preventing occurrence of a bright line between the lamps.

15. A liquid crystal display apparatus comprising:
a liquid crystal display panel to display an image using liquid crystal;
a receiving container having a bottom surface and a sidewall extended from an edge of the bottom surface so as to provide a receiving space; and
a plurality of lamps received into the receiving space in parallel to each other and disposed between the liquid crystal display panel and the receiving container so as to provide light to the liquid crystal,
wherein an interval between the lamps gradually increases from a first end of the receiving container to a second end of the receiving container, and the first end is disposed at a position lower than a position of the second end.

16. A liquid crystal display apparatus comprising:
a liquid crystal display panel to display an image using liquid crystal;
a receiving container having a bottom surface and a sidewall extended from an edge of the bottom surface so as to provide a receiving space; and
a plurality of lamps received into the receiving space in parallel to each other and disposed between the liquid crystal display panel and the receiving container so as to provide light to the liquid crystal, each of the lamps having a lamp tube into which a discharge gas is injected, and a first electrode and a second electrode disposed at a first end portion and a second end portion of the lamp tube, respectively, and each of the lamps having different brightness from each other in accordance with temperature distribution of the receiving space, the brightness of each of the lamps being inversely proportional to the temperature distribution of the receiving space to provide uniform brightness from the backlight assembly.

17. The liquid crystal display apparatus of claim 16, wherein the first electrode is disposed at an outer surface of the lamp tube,
wherein an area of the first electrode gradually decreases from a first end of the receiving container to the second end of the receiving container, which is substantially parallel to the first end,
wherein the first end is disposed at a position lower than a position of the second end.

18. The liquid crystal display apparatus of claim 16, wherein an amount of the discharge gas injected into each of the lamps gradually increases from a first end of the receiving container to a second end of the receiving container, which is substantially parallel to the first end, wherein each of the lamps comprises a tube current of about 5 to about 6 milliamperes;

wherein an inner temperature of the receiving space gradually increases from the first end to the second end, and wherein the first end is disposed at a position lower than a position of the second end.

19. The liquid crystal display apparatus of claim 16, wherein the discharge gas comprises at least an argon gas and a neon gas, and wherein a ratio between the argon gas and the neon gas is different from each other.

20. The liquid crystal display apparatus of claim 19, wherein an amount of the neon gas injected into the lamps gradually decreases from the first end to the second end, which is substantially parallel to the first end, wherein an amount of the argon gas injected into the lamps gradually increases from the first end to the second end, and wherein an inner temperature of the receiving container is lower than about 50 degrees in Celcius.

21. The liquid crystal display apparatus of claim 16, further comprising a diffusion member disposed on the lamps so as to diffuse light emitted from the lamps, thereby preventing occurrence of a bright line between the lamps.

* * * * *